(12) United States Patent
Mueller

(10) Patent No.: US 10,175,091 B2
(45) Date of Patent: Jan. 8, 2019

(54) REMOTE SENSOR CONTROL SYSTEM

(71) Applicant: Altec Industries, Inc., Birmingham, AL (US)

(72) Inventor: Joshua Daniel Mueller, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 167 days.

(21) Appl. No.: 15/374,369

(22) Filed: Dec. 9, 2016

(65) Prior Publication Data

US 2018/0164148 A1    Jun. 14, 2018

(51) Int. Cl.
  *B66F 17/00* (2006.01)
  *G01G 19/12* (2006.01)
  *G01G 23/00* (2006.01)
  *B66C 15/06* (2006.01)

(52) U.S. Cl.
  CPC ......... *G01G 23/007* (2013.01); *B66C 15/065* (2013.01); *B66F 17/006* (2013.01); *G01G 19/12* (2013.01)

(58) Field of Classification Search
  CPC .... G01G 23/007; G01G 19/12; B66F 17/006; B66C 15/065
  USPC .......................................................... 73/579
  See application file for complete search history.

(56) References Cited

U.S. PATENT DOCUMENTS

| | | | | |
|---|---|---|---|---|
| 4,794,619 A * | 12/1988 | Tregay | ...................... | G01J 5/08 374/126 |
| 4,939,482 A * | 7/1990 | Nergaard | ............. | H04B 10/502 332/183 |
| 2004/0149436 A1* | 8/2004 | Sheldon | .............. | E21B 47/0007 166/250.15 |
| 2013/0342186 A1* | 12/2013 | Pagani | ................ | G01M 5/0083 324/71.1 |
| 2015/0135846 A1* | 5/2015 | Pagani | .................... | G01M 5/00 73/777 |

* cited by examiner

*Primary Examiner* — Jacques M Saint Surin
(74) *Attorney, Agent, or Firm* — Erise IP, P.A.

(57) ABSTRACT

A remote sensor control system provides a sensor reading from an insulated environment at a certain interval dependent upon the threat level. The remote sensor control system has a control module and a remote module. The control module is disposed outside the insulated environment. The control module includes an energy source configured to produce an energy beam. The remote module is disposed at least partially within the insulated environment. The remote module is configured to receive the energy beam from the energy source. The remote module includes a battery, a sensor reader configured to sample a sensor, and an optical power gate configured to provide power from the battery to the sensor reader upon receiving said energy beam from the energy source.

19 Claims, 5 Drawing Sheets

REMOTE SENSOR CONTROL SYSTEM

BACKGROUND

1. Field

Embodiments of the invention relate to the sensors disposed in an insulated environment. More specifically, embodiments of the invention relate to the control of these remote sensors.

2. Related Art

Utility workers utilize a utility vehicle to reach inaccessible locations. The utility vehicle generally includes a boom with a utility platform. The utility worker stands in the elevated utility platform while performing a task. Electric utility workers typically use a utility vehicle to access overhead electric power lines and electric power components for installation, repair, or maintenance. The utility platforms utilized by electric utility workers are highly insulated so as to prevent the discharge of electricity through the utility vehicle, and especially through the utility worker. The insulated nature of the utility platform prevents the transmission of electricity via conventional wiring to electronic components in the utility platform.

Reading a sensor disposed in the insulated utility platform presents a problem. Some systems utilize a battery to power a sensor-reader. The sensor reader must be turned on and off by the operator. The operator may forget to turn the sensor reader on (such that the sensor reader cannot function) or off (such that the battery drains during periods in which the aerial device is not being used). The operator may also purposefully not turn on the sensor reader to avoid the alert that is produced by the sensor reader.

SUMMARY

Embodiments of the invention solve the above-mentioned problems by providing a remote sensor control system. The remote sensor control system periodically activates a sensor reader and receives a sensor reading while not compromising the insulated environment of the sensor reader. The remote sensor control system may therefore minimize battery drain, ensure that the sensor reading is functioning, and intelligently request readings at certain times.

A first embodiment of the invention is directed to a remote sensor control system configured to provide a sensor reading from an insulated environment, the remote sensor control system comprising a control module and a remote module. The control module is disposed outside the insulated environment. The control module includes an energy source configured to produce an energy beam. The remote module is disposed at least partially within the insulated environment. The remote module is configured to receive the energy beam from the energy source. The remote module includes a battery, a sensor reader configured to sample a sensor, and an optical power gate configured to provide power from the battery to the sensor reader upon receiving said energy beam from the energy source.

A second embodiment of the invention is directed to a computerized method of monitoring a sensor reading from an insulated environment, the method comprising the following steps: producing a first energy beam directed to a remote module; receiving a sensor reading from the remote module; determining a threat level based upon the sensor reading; determining an interval based upon the threat level; and producing, after the interval, a second energy beam directed to the remote module.

A third embodiment of the invention is directed to a computerized method of providing a sensor reading through an insulated environment, the method comprising the following steps: acquiring an energy beam from a control device; activating an optical power gate so as to allow power to flow from a battery to a sensor reader, wherein the optical power gate is activated by the energy beam; sampling, by the sensor reader, a sensor in the insulated environment; and sending a sensor reading to the control device.

Another embodiment of the invention may be directed to a non-transitory computer readable medium having a computer program stored thereon. The computer program instructs at least one processing element to perform the above-discussed steps of the computerized methods. Yet another embodiment of the invention is directed to a control module configured to monitor a sensor reading in an insulated environment. Still another embodiment may be directed to a remote module configured to provide a sensor reading through an insulated environment.

Still other embodiments of the invention may be directed to an aerial device. The aerial device includes a base, a boom assembly, a utility platform, and a remote sensor control system. The remote sensor control system includes a control module disposed on the base of the aerial device, a remote module disposed on the utility platform, and an optical fiber traversing the boom assembly. The remote sensor control system monitors a load on the utility platform and/or the boom assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
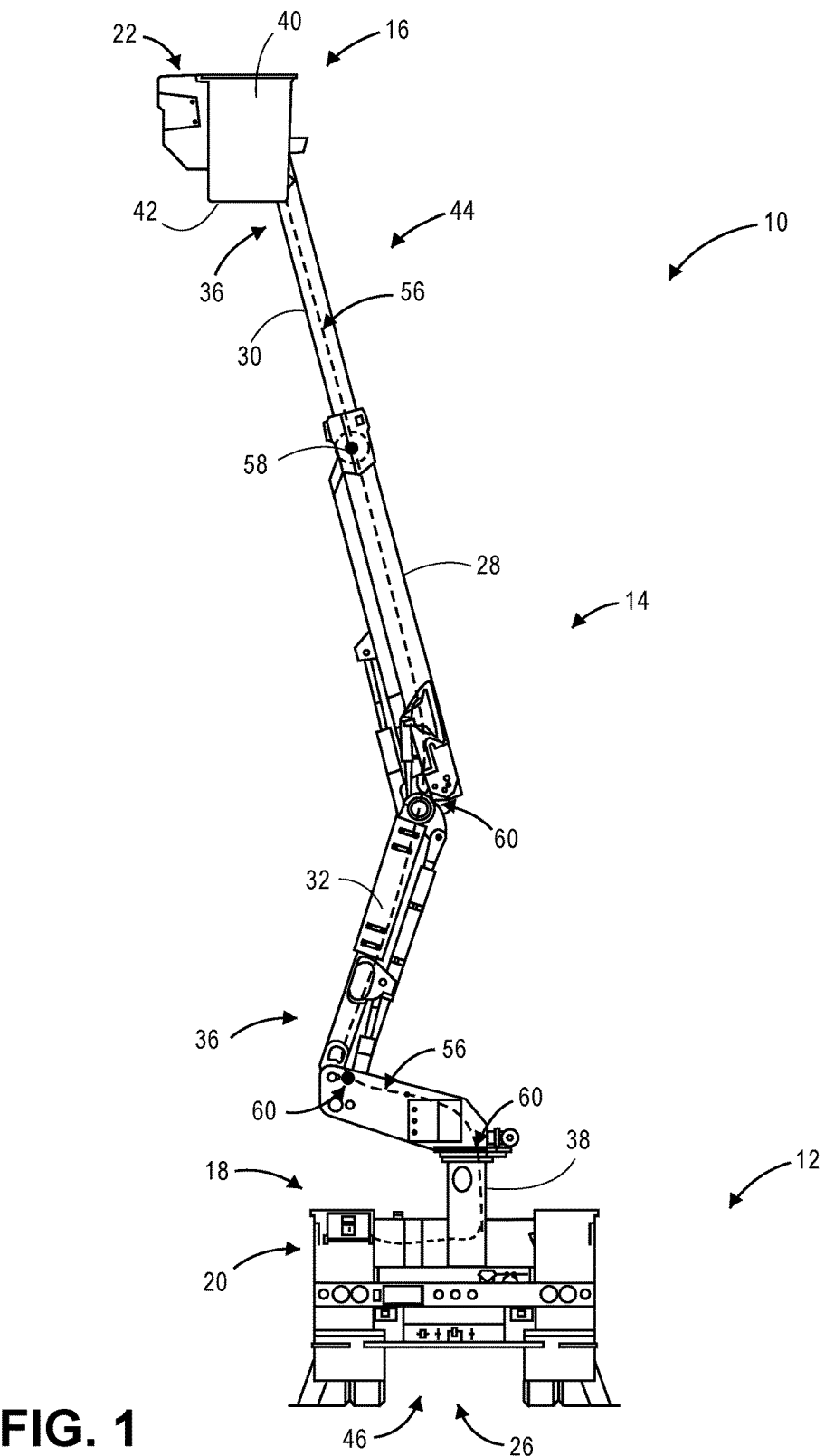
FIG. 1 is a rear view of an aerial device that may utilize a remote sensor control system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

An aerial device 10, constructed in accordance with various embodiments of the invention, is shown in FIG. 1. The aerial device 10 generally comprises a base 12 with a boom assembly 14 rotatably mounted thereto. A utility platform assembly 16 is disposed on the boom assembly 14 to provide an aerial platform for the accomplishment of a task by a utility worker. The aerial device 10 further comprises a remote sensor control system 18, which includes a control module 20 configured to request a signal reading, and a remote module 22 configured to read a sensor 24.

The base 12 of the aerial device 10 is a selectively stabilized platform. In embodiments of the invention, the base 12 is a utility truck (as illustrated in FIG. 1), a crane base, an oilrig, an earth-working machine, or a fixed structure. The base 12 provides stability and a counterweight to a load being supported by the boom assembly 14. The base 12 may be grounded and/or otherwise in contact with the ground. As such, the base 12 is outside of an insulated environment (which is typically associated with the utility platform assembly 16).

The base 12 has an engine or other unconstrained power source 26. The power source 26 has a few primary functions, such as moving the base 12 and operating the boom assembly 14. In embodiments of the invention, the power source 26 is an internal combustion engine that rotates the wheels and/or track of the base 12 to move the base 12 to or around a worksite. In other embodiments, the power source 26 is a battery, a gasoline/electric hybrid, a turbine engine, or the like (not illustrated). In embodiments of the invention, the power source 26 provides power to hydraulic pumps and hydraulic brakes. The hydraulic pumps and brakes manipulate the boom assembly 14 via providing hydraulic power. The power source 26 may also power the control module 20.

The boom assembly 14 broadly comprises a lower boom section 28 and at least one insulated upper boom section 30. It should be appreciated that the majority of the present disclosure is concerned with the detection of strain within the upper boom section 30, which will commonly be referred to as an insulated boom section because other boom sections may also be insulated for safety reasons. As illustrated in FIG. 1, some embodiments of the boom assembly 14 may further comprise at least one pivoting boom section 32.

The boom assembly 14 presents a proximal end 34 and a distal end 36. The proximal end 34 is rotatably and/or pivotably secured to a portion of the base 12, such as a boom turret 38. The distal end 36 is secured to the utility platform assembly 16. In some embodiments, the at least one upper boom section 30 is at least in part disposed within the lower boom section 28. The at least one upper boom section 30 telescopes to extend or retract into the lower boom section 28. In other embodiments, the upper boom section 30 pivots relative to the lower boom section 28, such as illustrated in FIG. 1. The pivoting boom section 32 does not telescope out of any other boom section. Instead the pivoting boom section 32 rotates about the base 12, and the first boom section pivots and/or rotates relative to the pivoting boom section 32. The use of the pivoting boom section 32 allows the utility platform assembly 16 to reach certain areas and avoid obstacles in the working environment.

Figure 5:
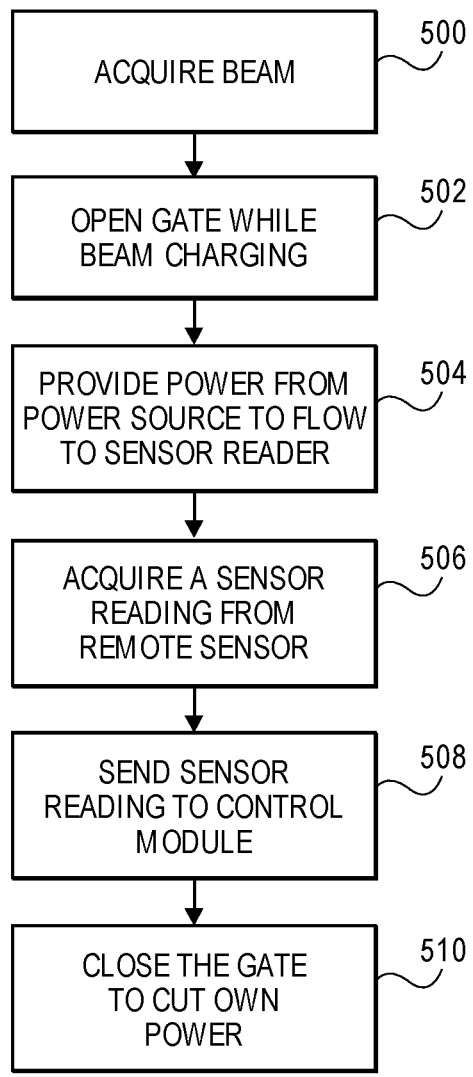
FIG. 5 is a flow diagram illustrating exemplary steps performed by a remote module.

The utility platform assembly 16 provides an elevated surface from which at least one utility worker can perform a task. As illustrated in FIG. 5, embodiments of the utility platform assembly 16 comprise four bucket sidewalls 40 and a bucket floor 42 that collectively form a cavity. The utility platform assembly 16 may also present a bucket lip along a top portion of at least one bucket sidewall. The utility platform assembly 16 may further comprise a step and/or a door (not illustrated) in at least one of the bucket sidewalls 40 to allow for ingress and egress of the utility worker. The utility platform assembly 16 may also comprise a handrail (not illustrated). The four bucket sidewalls 40 and the bucket floor 42 of the utility platform assembly 16 form the cavity. The four bucket sidewalls 40 may be unitary, i.e. formed of a single monolithic structure, or they may be coupled together. The transition between successive bucket sidewalls 40, and/or between the bucket sidewalls 40 and the bucket floor 42, may be rounded or arcuate.

In some embodiments, the utility platform assembly 16 presents a horizontal cross-section that is substantially rectangular. Thus, two of the opposing bucket sidewalls 40 may have a greater width than the other two opposing bucket sidewalls 40. In other embodiments, the utility platform assembly 16 presents a horizontal cross-section that is substantially square, or another shape.

Figure 2:
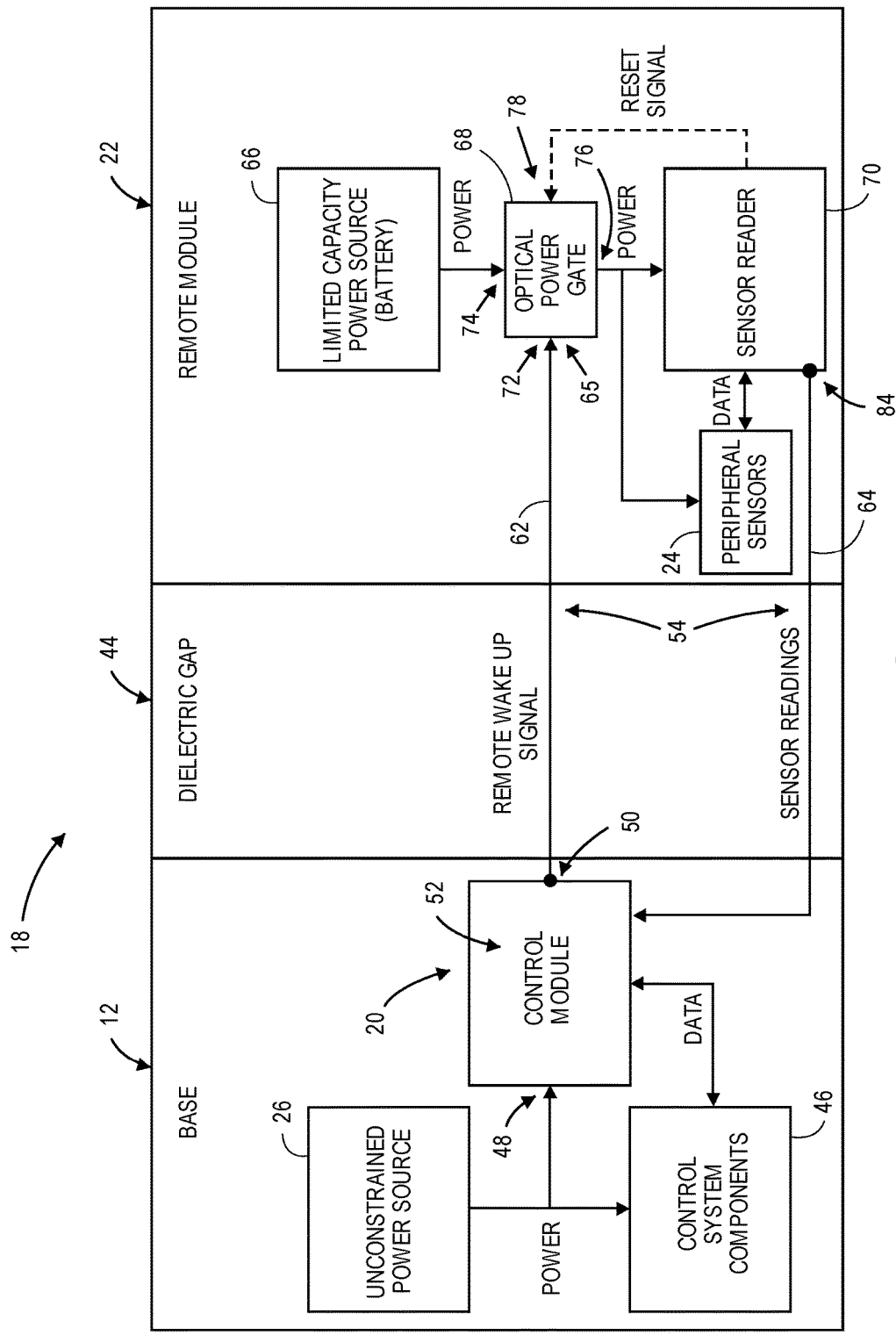
FIG. 2 is a schematic view of various components of the remote sensor control system.

Turning to FIG. 2, the remote sensor control system 18 will now be discussed in greater detail. The remote sensor control system 18 comprises a control module 20 and a remote module 22. In embodiments of the invention, the control module 20 is disposed at or otherwise associated with the base 12 of the aerial device 10 and the remote module 22 is disposed at or otherwise associated with the utility platform assembly 16 of the aerial device 10. As discussed above, the utility platform assembly 16 is electrically isolated from the base 12 via a dielectric gap 44, as illustrated in FIG. 2. The dielectric gap 44 ensures that there is no discharge of electricity through the boom assembly 14. However, due at least in part to construction from dielectric material, such as fiber glass, loads upon the utility platform assembly 16 can lead to structural damage and structural failure. Therefore, measuring the load at the utility platform assembly 16 while maintaining the dielectric gap 44 and minimizing battery consumption at the utility platform assembly 16.

FIG. 2 illustrates three exemplary regions: the base 12, the dielectric gap 44, and the remote module 22. The base 12 may be electrically grounded and includes various electronic components, such as the control module 20, a set of control system components 46, and the unconstrained power source 26. The control module 20 determines when to request sensor readings from the remote module 22, as discussed more below. The control system components 46 control the other various functions of the aerial device 10, such as moving the boom assembly 14 and the utility platform assembly 16. The unconstrained power source 26 is the battery, internal combustion engine, electrical engine, or other electrical system of the base 12. The control module 20 is configured to interface with the power source 26 associated with a base 12 of an aerial device 10 so as to receive power.

In embodiments of the invention, the control module 20 comprises an electrical-energy receptor 48, at least one beam source 50, and a processor 52. The at least one beam source 50 is located within a housing (not illustrated). The control module 20 is located on the base 12 of the utility vehicle. In embodiments, the control module 20 is located near the proximal end 34 of the boom assembly 14. The control module 20 receives, via the electrical-energy receptor 48 and from electrical lines, power from the power source 26. The power is used to energize the beam source 50. In embodiments of the invention, the beam source 50 is a light emitting diode (LED), incandescent light bulb, a discharge tube, or other light-emitting device or apparatus. The beam source 50 generates photons, which are directed into the fiber optic cable 56. The beam source 50 is powered by the power source 26 of the base 12 of the aerial device 10.

The processor 52 determines when to produce light via the beam source 50. By producing light via the beam source 50, the processor 52 is instructing the remote module 22 to sample the sensor 24 and provide a sensor reading. In embodiments of the invention, the processor 52 has an associated memory element. The memory element may be a non-transitory computer readable medium having a computer program stored thereon. The computer program instructs the processor 52 to perform the steps illustrated in FIG. 4 and discussed below. The processor 52 may instruct the remote module 22 to sample the sensor 24 based upon information indicative of aerial device 10 operations from the control system components 46. For example, the control system components 46 may indicate that the boom assembly 14 is no longer adjacent to a boom rest, that a pump is pumping hydraulic fluid through hydraulic lines so as to move the boom assembly 14, that the operator has requested or instructed the aerial device 10 to move, that a load has been emplaced on the aerial device 10 (as detected by various sensors outside the remote module 22), that the outriggers have been or are being emplaced, or other indication that a load is or likely will soon be placed on the utility platform assembly 16.

The dielectric gap 44, as illustrated in FIG. 2, is the dielectric components of the boom assembly 14 and utility platform assembly 16. The dielectric gap 44 isolates the electrical components of the remote module 22 from the base 12, so as to prevent a discharge through the boom assembly 14. The dielectric gap 44 may include an energy transmission assembly 54 that traverses the dielectric gap 44 non-conductively. The energy transmission assembly 54 allows the passing of an energy beam (such as light, a laser, hydraulic fluid, or other non-conductive fluid) therethrough.

The energy transmission assembly 54 transmits the energy from the control module 20 to the remote module 22 in an insulated manner. In order to prevent the dangerous discharge of electricity through the utility vehicle and potentially the utility worker, the energy transmission assembly 54 does not utilize traditional electrical wires. While shielding is available and effective, traditional electrical wires carry with them an inherent risk of discharge should the shielding become compromised. The energy transmission assembly 54 therefore allows information to pass therethrough without allowing for an electrical discharge.

The energy transmission assembly 54 is configured to travel with and through the boom assembly 14. To prevent crimping, in embodiments of the invention, a fiber optic cable 56 is run through boom assembly 14. As schematically shown in FIG. 1, the fiber optic cable 56 may be run inside of, alongside, or adjacent to the boom assembly 14 (or any combination thereof). Many utility vehicles already run hydraulic lines up along the boom assembly 14 to the utility platform assembly 16. This allows for control of the boom assembly 14 via the set of upper controls. Accordingly, in embodiments of the invention, the fiber optic cable 56 of the energy transmission assembly 54 is run alongside these hydraulic lines.

As illustrated in FIG. 1 and discussed above, in embodiments of the invention the boom assembly 14 telescopes. In order to accommodate such a telescoping action, some embodiments of the invention include an internal reel 58 and at least one fiber optic junction 60. The fiber optic cable 56 attaches to the fiber optic junction 60 that is associated with the internal reel 58. The fiber optic junction 60 allows the reel to loosen and tighten an upper section of fiber optic cable 56 while a lower section of fiber optic cable 56 can transfer light.

In embodiments of the invention, the energy transmission assembly 54 comprises a first optical fiber 62 and a second optical fiber 64, as illustrated in FIG. 2. The first optical fiber 62 allows for the passage of the energy beam upward (e.g. from the control module 20 to the remote module 22), and the second optical fiber 64 allows for the passage of the sensor reading downward (e.g., from the remote module 22 to the control module 20). The first optical fiber 62 may be adjacent to the second optical fiber 64 within a single shielding, or the first optical fiber 62 may be adjacent to the second fiber in a separate shielding. It should be appreciated that both the first optical fiber 62 and the second optical fiber 64 transmit information in the form of light. In embodiments of the invention, the energy beam may be a continuous stream of light configured to activate a phototransistor 65 (as discussed below) so as to activate the optical power gate 68, and the sensor reading may be an encoded information beam.

The remote module 22 will now be discussed in greater detail. The remote module 22 broadly comprises a battery 66, an optical power gate 68, and a sensor reader 70. In embodiments of the invention, the remote module 22 may further comprise at least one sensor 24. The remote module 22 is disposed within the insulated environment, that is on, in, adjacent to, or otherwise associated with the utility platform assembly 16. The remote module 22 samples the sensor 24 and sends a sensor reading to the control module 20. The remote module 22 allows the control module 20 to determine a sensor reading as needed without compromising the electrical isolation of the sensors 24.

The battery 66 is used to power the remote module 22. The battery 66 is typically a self-contained power source that utilizes a chemical reaction to generate an electrical current. The electrical current is then utilized by the sensor reader 70 (while the optical gate is activated) to sample the sensor 24 and perform other functions. In embodiments of the invention, the battery 66 (as well as the other components of the remote module 22) are housed within an insulated housing (not illustrated) so as to prevent damage to the electrical components of the remote module 22, prevent damage to the battery 66, and prevent an electrical discharge from an external electrified sources (such as a power line, power transformer, or the like). In embodiments of the invention, the battery 66 is a small, commercially available battery (such as a AAA battery, a AA battery, a 9-Volt battery, a C battery, a D battery, an LR44 battery, or other size battery). Small, commercially available batteries may be used so as to allow easy replacement upon the battery 66 becoming drained.

The battery 66 is in electrical communication with the optical power gate 68. The optical power gate 68 allows the battery 66 to selectively flow therethrough to the sensor reader 70. The optical power gate 68 prevents the sensor reader 70 from operating longer than is necessary for sampling the sensor 24 and sending the sensor reading (and performing other related functions). The optical power gate 68 is configured to be in either of two positions, an activated position and a deactivated position. The activated position allows current to flow from the battery 66 to the sensor reader 70. The deactivated position prevents current from the battery 66 to the sensor reader 70. In some embodiments, the optical power gate 68 is in the activated position while the energy beam is being received (and while the phototransistor 65 is activated). In other embodiments, the optical power gate 68 is in the activated position while either the energy beam is being received or the reset signal is not received (as discussed below).

Figure 3:
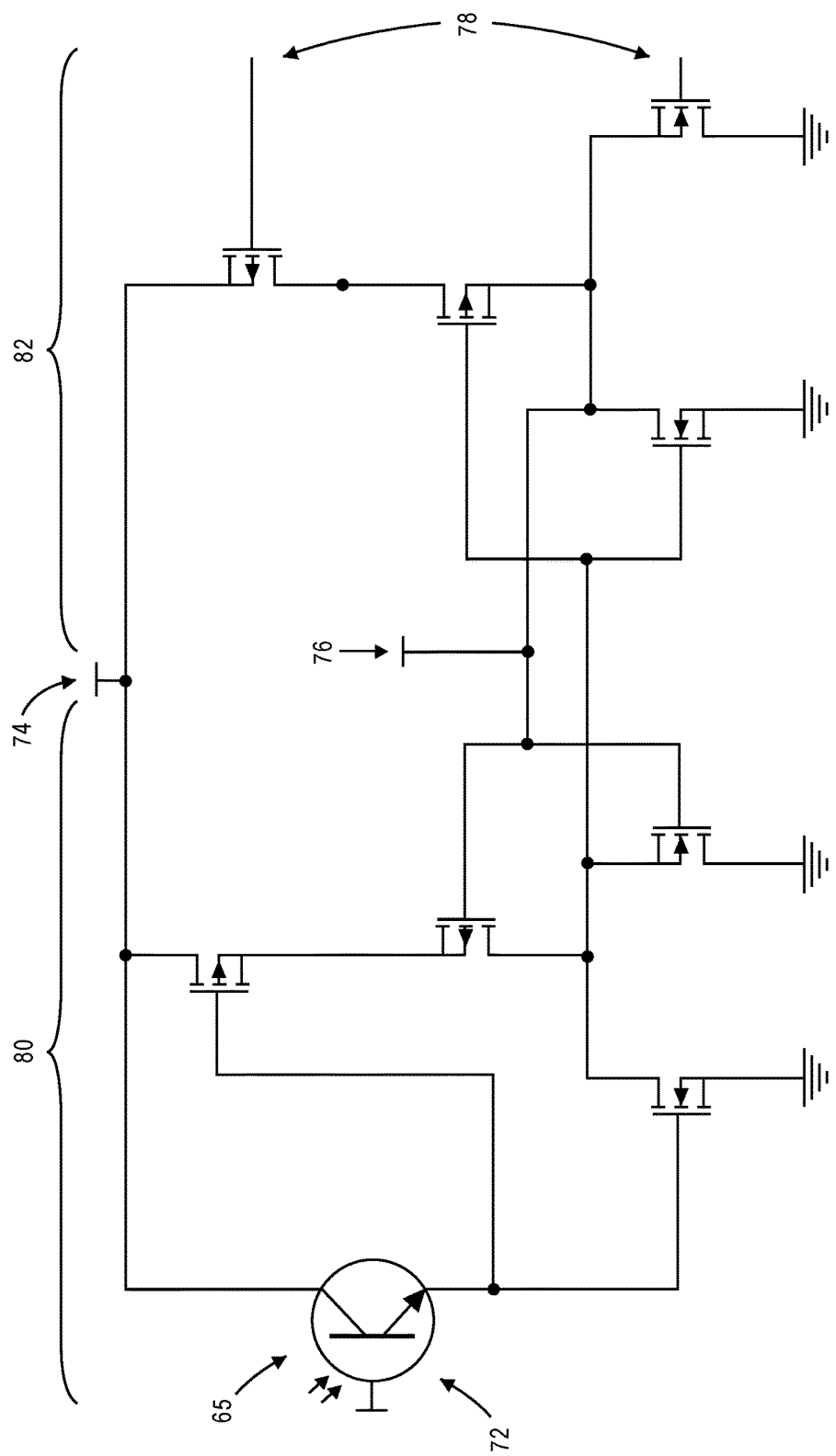
FIG. 3 is a circuit diagram of an optical power gate of the remote sensor control system.

FIG. 3 illustrates an exemplary circuit diagram of the optical power gate 68, such as an set-reset ("SR") latch circuit. In embodiments of the invention, the circuit as illustrated has four external interfaces. The first external interface 72 is the optical fiber input that allows the energy beam to shine upon the phototransistor 65. The second external interface 74 is a power input that is electrically connected to the battery 66. The third external interface 76 is a power output that is electrically connected to the sensor reader 70. The fourth external interface 78 is a reset input that prevents the flow of current upon the sensor reader 70 providing a reset signal. In other embodiments of the invention, circuit does not include the fourth external interface 78 (and by extension, most of the right side of the circuit diagram). In these other embodiments, the phototransistor 65 allows current to flow in the presence of the energy beam and prevents current flow in the absence of the energy beam. This may be advantageous in that it simplifies the circuitry required but may be disadvantageous because it can cut off the operations of the remote module 22 before complete or cause excess power drainage.

As the current enters the circuit from the first external interface 72 (e.g., from the battery 66), the current can flow through either a set side 80 of the circuit (on the left as illustrated) or a reset side 82 of the circuit (on the right as illustrated). The current will flow through the set side 80 if the phototransistor 65 is activated. The phototransistor 65 will remain activated while the energy beam is placed thereon. The current will also flow through the reset side 82 until the reset signal is sent from the sensor reader 70.

It should be appreciated that the optical power gate 68, the sensor reader 70, and/or the sensor 24 may be disposed on the same circuit board, within the same housing, or the like. The illustrated circuit for the optical power gate 68 is therefore provided to give an example of circuitry that may be utilized in the optical power gate 68. The illustrated circuit may be integrated into the sensor reader 70.

The sensor reader 70 samples the sensor 24 so as to determine the sensor reading. In embodiments of the invention, the sensor reader 70 is an integrated circuit that is associated with the sensor 24. In other embodiments, the sensor reader 70 is a stand-alone device that is communicatively coupled to the sensor 24. The sensor reader 70 also sends the sensor reading to the control module 20 or the other control systems components of the base 12 of the aerial device 10. The sensor reader 70 may therefore include a second beam source 84. The power from the battery 66 is used to energize the beam source 50. The second beam source 84 is a light emitting diode (LED), incandescent light bulb, a discharge tube, or other light-emitting device or apparatus. The second beam source 84 generates photons, which are directed into the second fiber optic cable 56 (e.g., that is directed downward to the control device).

In embodiments of the invention, the sensor reader 70 is configured to instruct the optical power gate 68 to deactivate upon the sensor reader 70 sending the sensor reading to the control module 20. The sensor reader 70 instructs the optical power gate 68 to deactivate by sending a reset message to the reset side 82 of the optical power gate 68 circuit (as illustrated in FIG. 3). The reset message may be in the form of a command message or an electrical signal that resets the reset side 82 of the circuit. The sensor reader 70 may send this reset message upon the completion of all tasks. The tasks may include sampling one or more sensors 24, sending one or more sensor readings, and other housekeeping tasks.

The sensor 24 is disposed on or adjacent to the utility platform assembly 16. The sensor 24 detects a load, strain, weight, deflection, or other indication of the load on the utility platform assembly 16. For example, the sensor 24 may be located on or adjacent to a bracket that holds the utility platform assembly 16 to the boom assembly 14. The sensor 24 may therefore provide an indication of the strain upon a component of the bracket (such as a four-bar linkage, a plate, a traversing member, or other component). The sensor 24 therefore detects a load upon the utility platform assembly 16 of the aerial device 10 caused at least in part by the weight of the utility platform assembly 16. Because the load on the utility platform assembly 16 can change due to the various weights being placed on the utility platform assembly 16, the various angles and extensions of the boom assembly 14, and the various other factors that may affect the load on the utility platform assembly 16.

Various methods of the invention will now be discussed in greater detail. Embodiments of the invention are directed to a computerized method of monitoring a sensor reading from an insulated environment as performed by the control module 20. This method may comprise the following steps: producing a first energy beam directed to a remote module 22; receiving a sensor reading from the remote module 22; determining a threat level based upon the sensor reading; determining an interval based upon the threat level; and producing, after the interval, a second energy beam directed to the remote module 22. Other embodiments of the invention are directed to a computerized method of providing a sensor reading through an insulated environment as performed by the remote module 22. This method may comprise the following steps: acquiring an energy beam from a control device; activating an optical power gate 68 so as to allow power to flow from a battery 66 to a sensor reader 70, wherein the optical power gate 68 is activated by the energy beam; sampling, by the sensor reader 70, a sensor 24 in the insulated environment; and sending a sensor reading to the control device. Still other embodiments of the invention may be directed to other methods of requesting, controlling, and monitoring a remote sensor 24.

Figure 4:
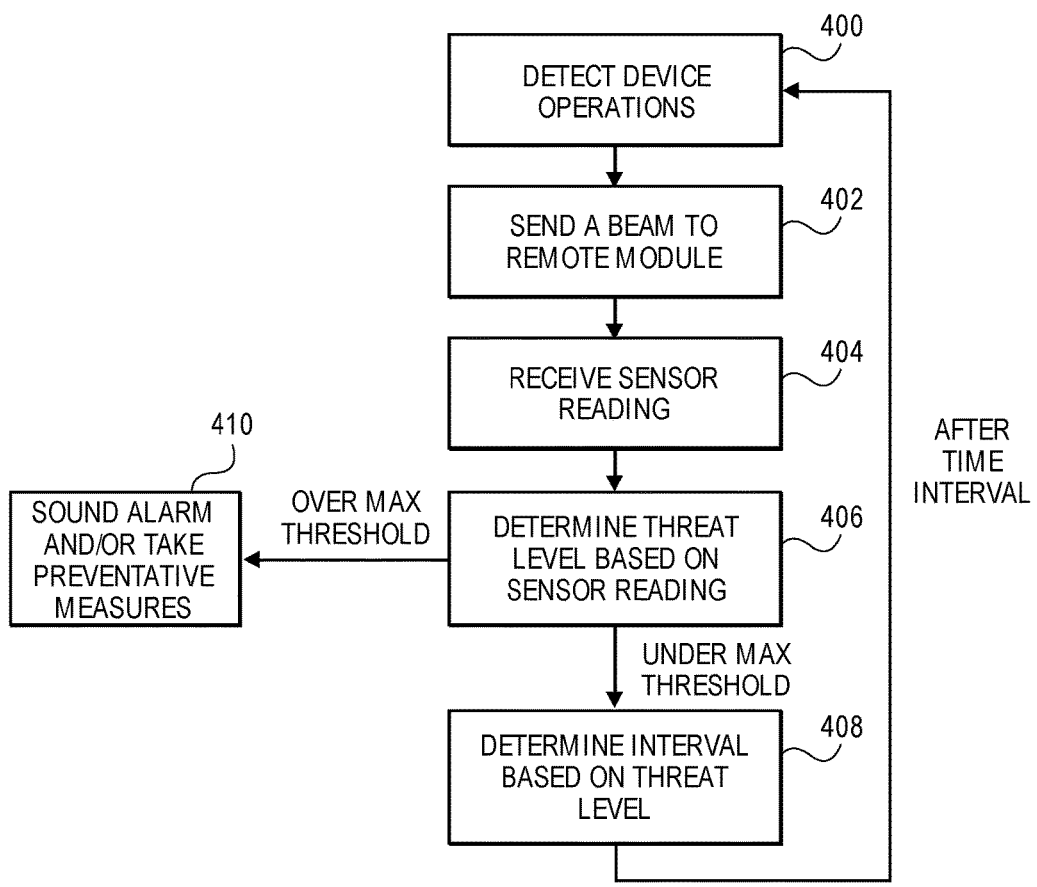
FIG. 4 is a flow diagram illustrating exemplary steps performed by a control module.

Turning to FIG. 4, an exemplary representation of steps of the method, as performed by the control module 20, is shown. It should be appreciated that, like the other figures shown and discussed, the steps discussed are merely exemplary. The steps may also be performed in any order and steps may be added or deleted. Further, the discussed steps are described as being performed by a "processor 52." The processor 52 provides processing functionality for the control module 20 and may include any number of processor 52s, micro-processor 52s, or other processing systems, and resident or external memory for storing data and other information accessed or generated by the remote sensor control system 18. The processor 52 may execute one or more software programs that implement the techniques and modules described herein. The processor 52 is not limited by the materials from which it is formed or the processing mechanisms employed therein and, as such, may be implemented via semiconductor(s) and/or transistors (e.g., electronic integrated circuits (ICs)), and so forth. It should also be appreciated that the discussed functions and methods performed by the processor 52 may be performed by other processor 52s.

In Step 400, the processor 52 detects device operations. The device operations are indicative that a load may be currently or may soon be emplaced on the utility platform assembly 16 and/or the boom assembly 14. In order to minimize battery 66 drain, in embodiments of the invention the processor 52 only performs the below steps upon a detection that the device (e.g., the aerial device 10 and/or associated equipment) is operational. For example, the control system components 46 may indicate that the boom assembly 14 is no longer adjacent to a boom rest, that a pump is pumping hydraulic fluid through hydraulic lines so as to move the boom assembly 14, that the operator has requested or instructed the aerial device 10 to move, that a load has been emplaced on the aerial device 10 (as detected by various sensors outside and not associated with the remote module 22), that the outriggers have been or are being emplaced, or other indication that a load is or likely will soon be placed on the utility platform assembly 16. The detected device operation is therefore indicative that a load may be upon the sensor 24 such that the sensor reading from the insulated environment is needed.

Similarly, the processor 52 may cease performing the below-discussed steps upon detecting that the device is no longer operating. This will also save battery life of the battery 66 in the remote module 22 by only requesting sensor readings while the device is operating (as the device will typically not be under a load while not operating).

In Step 402, the processor 52 sends an energy beam to the remote module 22. The processor 52 sends the energy beam by instructing the beam source 50 (such as an LED or other light source) to produce the energy beam and/or by providing power to the beam source 50. In embodiments of the invention, the energy beam is light that is configured to activate the optical power gate 68 so as to allow a battery 66 to power a sensor reader 70 of the remote module 22 in the insulated environment. Step 402 may further include directing the energy beam through a first optical fiber 62 toward the remote module 22. The directing may be performed by positioning the beam source 50 adjacent to the first optical fiber 62 such that at least a portion of the light produced by the beam source 50 will be directed through the first optical fiber 62 toward the remote module 22.

In some embodiments of the invention, the duration of the energy beam may be indicative of the duration of the power that will be utilized by the remote module 22. For example, the energy beam may have a duration that is configured to provide enough time for the optical gate to activate, for the sensor reader 70 to sample the sensor 24, and for the sensor reader 70 to send the sensor reading to the control module 20. In other embodiments of the invention, the duration of the energy beam is not indicative of the duration of the power that will be utilized by the remote module 22. In these embodiments, the remote module 22 will instead send a reset message to deactivate the optical gate upon completing the required tasks.

In Step 404, the processor 52 receives a sensor reading from the remote module 22. In embodiments of the invention, the sensor reading is received via a second optical fiber 64 from the remote module 22. In other embodiments, the sensor reading is received via the first optical fiber 62. In these embodiments, the remote sensor control system 18 may implement time division multiplexing and/or wave length division multiplexing to utilize upward and downward communication through the same optical fiber. Additionally or alternatively, the remote sensor control system 18 may include optical filters that only admit and detect the wavelengths predetermined for the intended message.

In Step 406, the processor 52 determines a threat level based at least in part on the sensor reading. The threat level is a measure of the likelihood of damage to the utility platform assembly 16 and/or boom assembly 14 based upon the current load that is detected. The threat level may be based at least in part upon the maximum safe operating parameters for the aerial device 10. The threat level may also be based upon the rate of change of the load. The threat level may further be based upon specific device operations. For example, the operation of a jib or winch associated with the utility platform assembly 16 may be indicative that a load will soon be placed upon the jib or winch. The possibility that the incipient load may overload the utility platform assembly 16 may therefore raise the threat level.

In Step 408, the processor 52 determines an interval based upon the threat level. The interval is a period of time between the requested sensor readings (e.g., between the initiation of subsequent iterations of the energy beam). If the threat level is high, the processor 52 selects a relatively short interval as an overload is possible or likely. If the threat level is low, the processor 52 selects a relatively long interval as an overload is less likely. This reduces battery drain while still providing adequate and timely readings to the control module 20. It should therefore be appreciated that initially, while the load on the utility platform assembly 16 is low, the processor 52 will select a long interval. Then, as the load on the utility platform assembly 16 increases due to the operations by the operator, the processor 52 will shorten the interval. The processor 52 may eventually select the shortest possible interval such that the remote module 22 is sending sensor readings substantially continuously.

In Step 410, the processor 52 determines whether the threat level is above a maximum threshold, and if so sounds an alarm and/or takes other preventative measures to prevent damage to the aerial device 10. The alarm may include audible alarms, audible voices, visual alarms, visible words, or the like (or some combination thereof). Examples of an alerting device (not illustrated) may include a speaker system, a display device, a headphone worn by the operator, light sources, and other similar devices. The alarm may also include an indication of the threat level and/or the sensor reading. The processor 52 therefore instructs, upon determining that the threat level is above the maximum threshold, an alarm to produce an alert for the operator such that the operator may reduce the load.

The maximum threshold is associated with a maximum safe operating load. The maximum safe operating load is indicative of potential damage to an aerial device 10 that includes the insulated environment (e.g., the utility platform assembly 16 and at least a portion of the boom assembly 14).

Subsequently, the processor 52 may produce, after the interval, a second energy beam directed to the remote module 22.

Turning to FIG. 5, an exemplary representation of steps of the method, as performed by the remote module 22, is shown. It should be appreciated that, like the other figures shown and discussed, the steps discussed are merely exemplary. The steps may also be performed in any order and steps may be added or deleted. Further, the discussed steps are described as being performed by the remote module 22 may be performed by any components thereof, such as the optical power gate 68 and/or the sensor reader 70.

In Step 500, the remote module 22 acquires the energy beam. In embodiments of the invention, this is a passive step. As such, the remote module 22 may be in a "sleep mode" a "low power mode" or an "unpowered mode" until the remote module 22 receives the energy beam. The sleep mode prevents the battery 66 from discharging unnecessarily. In embodiments of the invention, the step of acquiring an energy beam is performed by receiving the energy beam at a phototransistor 65. In Step 502, the remote module 22 activates the optical gate. As discussed above, the phototransistor 65 completes a circuit upon receiving a sufficient energy beam (e.g., light) thereon. The completed circuit thereafter allows current to flow from the battery 66.

In Step 504, the remote module 22 provides power from the battery 66 to the flow to the sensor reader 70. The power supplied to the sensor reader 70 allows the sensor reader 70 to thereafter perform various steps. In Step 506, the remote module 22 acquires a signal reading from a remote sensor 24. The remote sensor 24 is not directly connected to the control module 20 but may be directly connected (or otherwise communicatively coupled) with the remote module 22. The remote sensor 24 therefore measures a load, a strain, or other force from within the insulated environment and provides information indicative of that reading to the control module 20.

In Step 506, the remote module 22 acquires a sensor reading from the remote sensor 24. In some embodiments, the remote module 22 may sample the remote sensor 24 to determine a sensor reading. In other embodiments, the remote module 22 may request the sensor reading from the sensor 24 and receive the response therefrom.

In Step 508, the remote module 22 sends the sensor reading to the control module 20. In embodiments of the invention, the remote module 22 sends the sensor reading to the control module 20 via a second optical fiber 64 (e.g. separate and distinct from the first optical fiber 62 in which the energy beam was transmitted). The sensor reading may indicative of the measured reading of the sensor 24 along with other metadata (such as a time stamp, an identifier for the measured sensor 24, an identifier for the remote module 22, or the like).

In Step 510, the remote module 22 deactivates the optical power gate 68 to cut its own power. In embodiments of the invention, the deactivating is performed by the sensor reader 70 so as to cease power flowing from the battery 66 to the sensor reader 70. In other embodiments of the invention, the optical power gate 68 remains activated while the energy beam is acquired. In these embodiments, Step 510 is not performed. Instead, the control module 20 will leave the energy beam until the data has been received.

The remote module 22 then remains in a sleep state, using little to no power from the battery 66, until another wake signal from the control module 20 is received. The wake signal will typically be received after the above-discussed interval has elapsed, or the wake signal may not again be received until the beginning of the next task or function for the aerial device 10.

It should be appreciated that, while the above disclosure has been generally directed to the field of aerial device 10s, embodiments of the invention may be directed to other fields and uses. For example, embodiments of the invention may be used in stationary cranes, antennas, digger derricks, and other equipment that lifts off the ground from a stationary or selectively stationary location.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A remote sensor control system configured to provide a sensor reading from an insulated environment, the remote sensor control system comprising:
    a control module disposed outside the insulated environment,
    wherein the insulated environment is associated with a utility platform of an aerial device,
    said control module including an energy source configured to produce an energy beam; and
    a remote module disposed at least partially within the insulated environment,
    said remote module configured to receive the energy beam from the energy source,
    said remote module including
        a sensor reader configured to sample a sensor,
        wherein the sensor detects a load upon the utility platform of the aerial device caused at least in part by the weight of the utility platform,
        an optical power gate configured to provide power from a battery to the sensor reader upon receiving said energy beam from the energy source.

2. The remote sensor control system of claim 1,
    wherein the control module is configured to interface with a power source associated with a base of an aerial device,
    wherein the energy source is powered by the power source of the base of the aerial device.

3. The remote sensor control system of claim 1, wherein the energy source is a light emitting diode and the energy beam is light.

4. The remote sensor control system of claim 1, wherein the optical power gate comprises:
    a phototransistor that is configured to conduct upon the application of the energy beam,
    wherein the phototransistor conducting completes a circuit so as to allow power to pass from the battery to the sensor reader,
    wherein the battery providing power to the sensor reader allows the sensor reader to sample the sensor.

5. The remote sensor control system of claim 1,
    wherein the sensor reader is configured to instruct the optical power gate to deactivate upon the sensor reader sending the sensor reading to the control module,
    wherein the optical power gate deactivating prevents excess power drainage from the battery.

6. The remote sensor control system of claim 1,
    wherein the optical power gate is configured to provide power to the sensor reader while the energy beam is being received from the energy source, wherein the optical power gate is configured to cease providing power to the sensor reader upon the energy beam no longer being received.

7. The remote sensor control system of claim 1, wherein the remote sensor control system further comprises:
an optical fiber disposed between the control module and the remote module such that the optical fiber is configured to transmit the energy beam from the control module to the remote module.

8. The remote sensor control system of claim 7, wherein the optical fiber is disposed along a boom assembly of an aerial device that supports a utility platform above a base of the aerial device.

9. A computerized method of monitoring a sensor reading from an insulated environment, the method comprising the following steps:
producing a first energy beam directed to a remote module;
receiving a sensor reading from the remote module;
determining a threat level based upon the sensor reading;
determining an interval based upon the threat level; and
producing, after the interval, a second energy beam directed to the remote module.

10. The computerized method of claim 9, further comprising the following step:
detecting device operations prior to producing the first energy beam,
wherein the detected device operation is indicative that a load may be upon the sensor such that the sensor reading from the insulated environment is needed.

11. The computerized method of claim 9, further comprising the following step:
determining if the threat level is above a maximum threshold; and
instructing, upon determining that the threat level is above the maximum threshold, an alarm to produce an alert for the operator such that the operator may reduce the load.

12. The computerized method of claim 11,
wherein the maximum threshold is associated with a maximum safe operating load,
wherein the maximum safe operating load is indicative of potential damage to an aerial device that includes said insulated environment.

13. The computerized method of claim 9,
wherein the energy beam is configured to activate an optical power gate so as to allow a battery to power a sensor reader of the remote module in the insulated environment,
wherein the sensor reader is configured to sample a sensor.

14. The computerized method of claim 13, further comprising the following step:
directing the energy beam through a first optical fiber toward the remote module,
wherein the sensor reading is received via a second optical fiber from the remote module.

15. A computerized method of providing a sensor reading through an insulated environment, the method comprising the following steps:
acquiring an energy beam from a control device;
activating an optical power gate so as to allow power to flow from a battery to a sensor reader,
wherein the optical power gate is activated by the energy beam;
sampling, by the sensor reader, a sensor in the insulated environment; and
sending a sensor reading to the control device,
wherein the sensor reader is configured to instruct the optical power gate to deactivate upon the sensor reader sending the sensor reading to the control module,
wherein the optical power gate deactivating prevents excess power drainage from the battery.

16. The computerized method of claim 15, further comprising the following step:
deactivating, by the sensor reader, the optical power gate so as to cease power flowing from the battery to the sensor reader.

17. The computerized method of claim 15, wherein the optical power gate remains activated while the energy beam is acquired.

18. The computerized method of claim 15,
wherein the step of acquiring an energy beam is performed by receiving the energy beam at a phototransistor,
wherein the step of activating the optical power gate is performed by the phototransistor completing a circuit due to the energy beam thereon.

19. The computerized method of claim 15,
wherein the energy beam is directed to the optical power gate via a first optical fiber,
wherein the sensor reading is directed to the control device via a second optical fiber.

* * * * *